Feb. 6, 1934.   C. A. DE GIERS   1,945,736
LIQUID LEVEL INDICATOR
Filed July 10, 1929   5 Sheets-Sheet 1
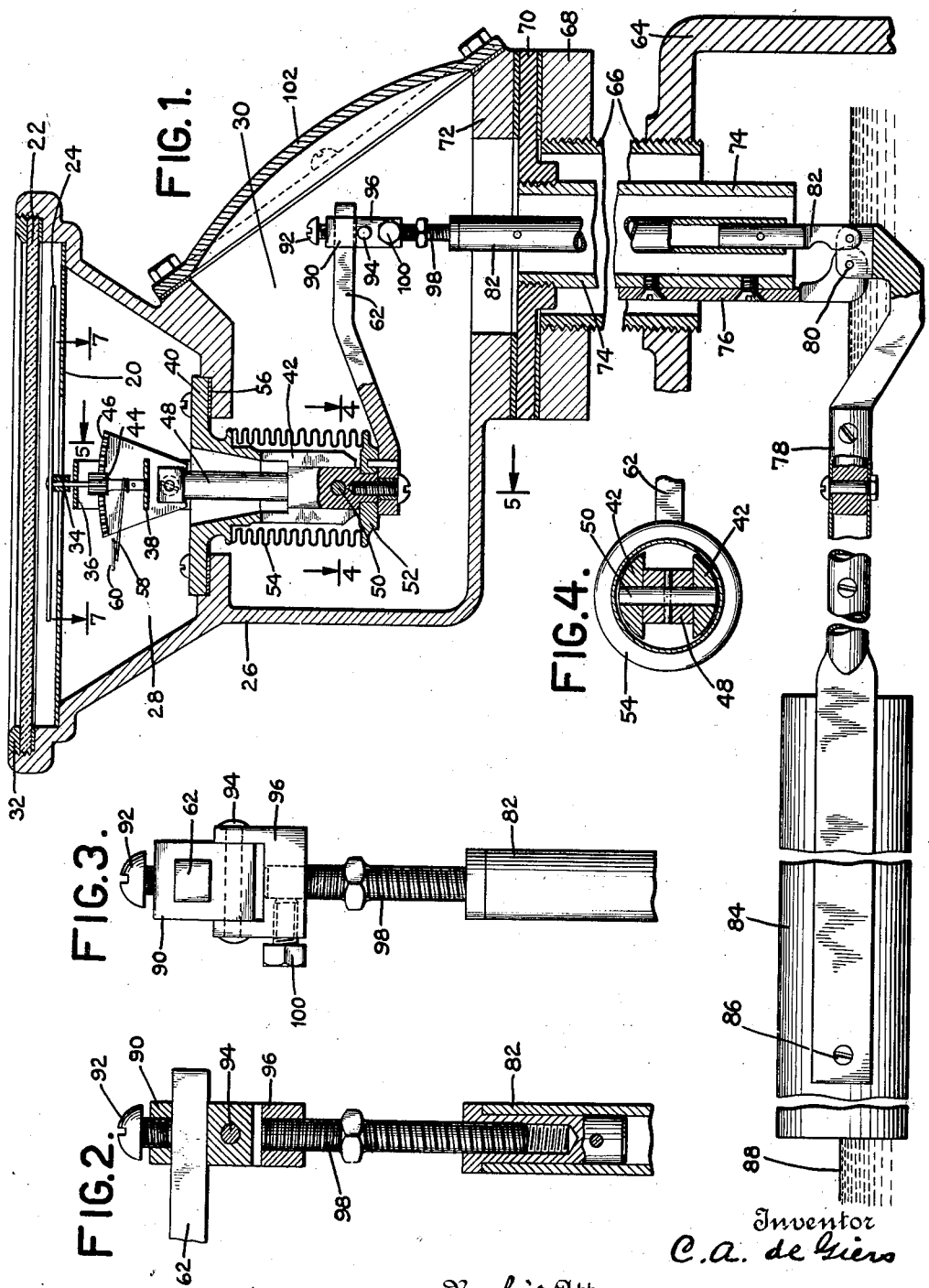
Inventor
C. A. de Giers
By his Attorneys
Cooper, Kerr & Dunham Feb. 6, 1934.  C. A. DE GIERS  1,945,736
LIQUID LEVEL INDICATOR
Filed July 10, 1929    5 Sheets-Sheet 2
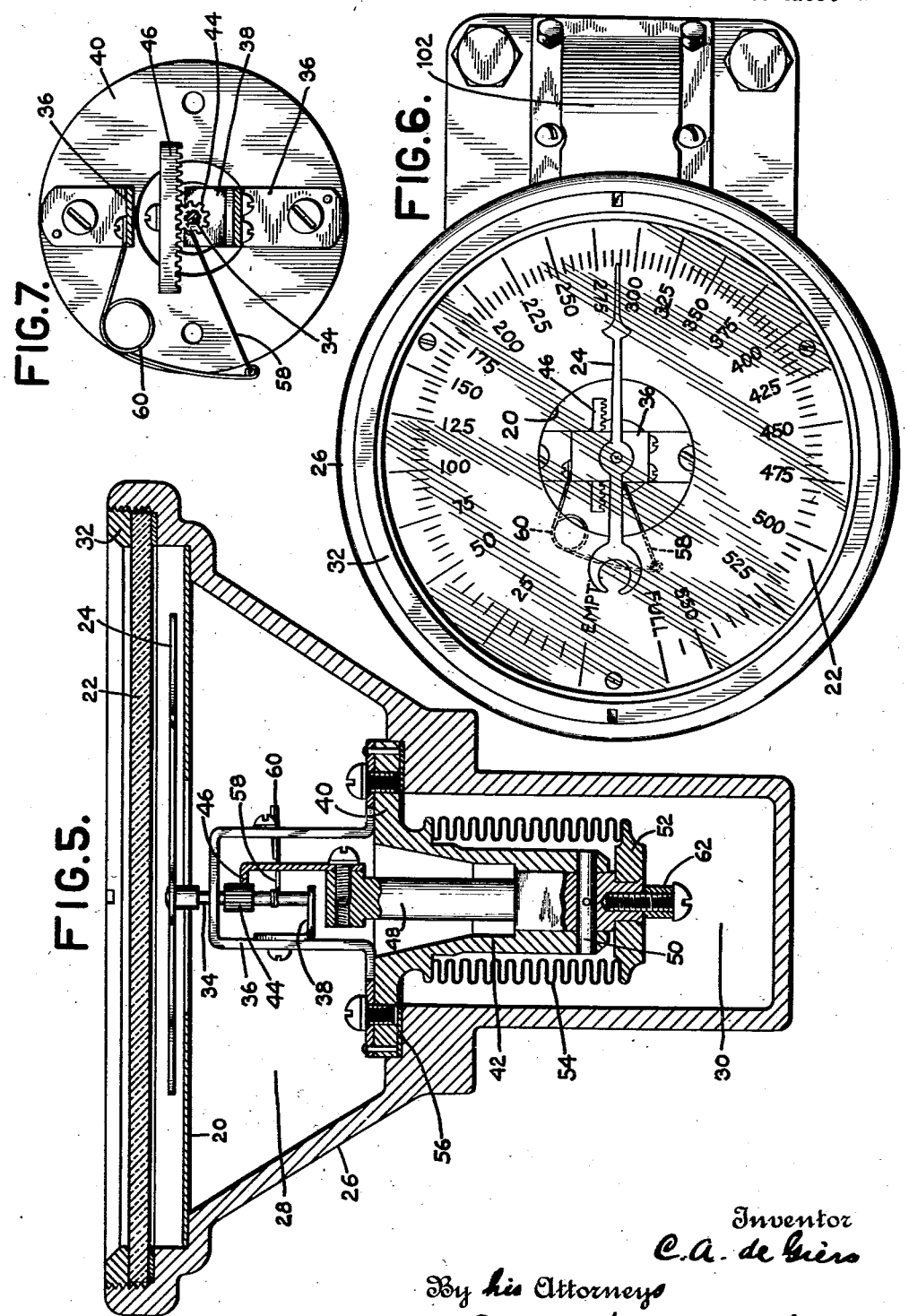
Inventor
C. A. de Giers
By his Attorneys
Cooper, Kerr & Dunham

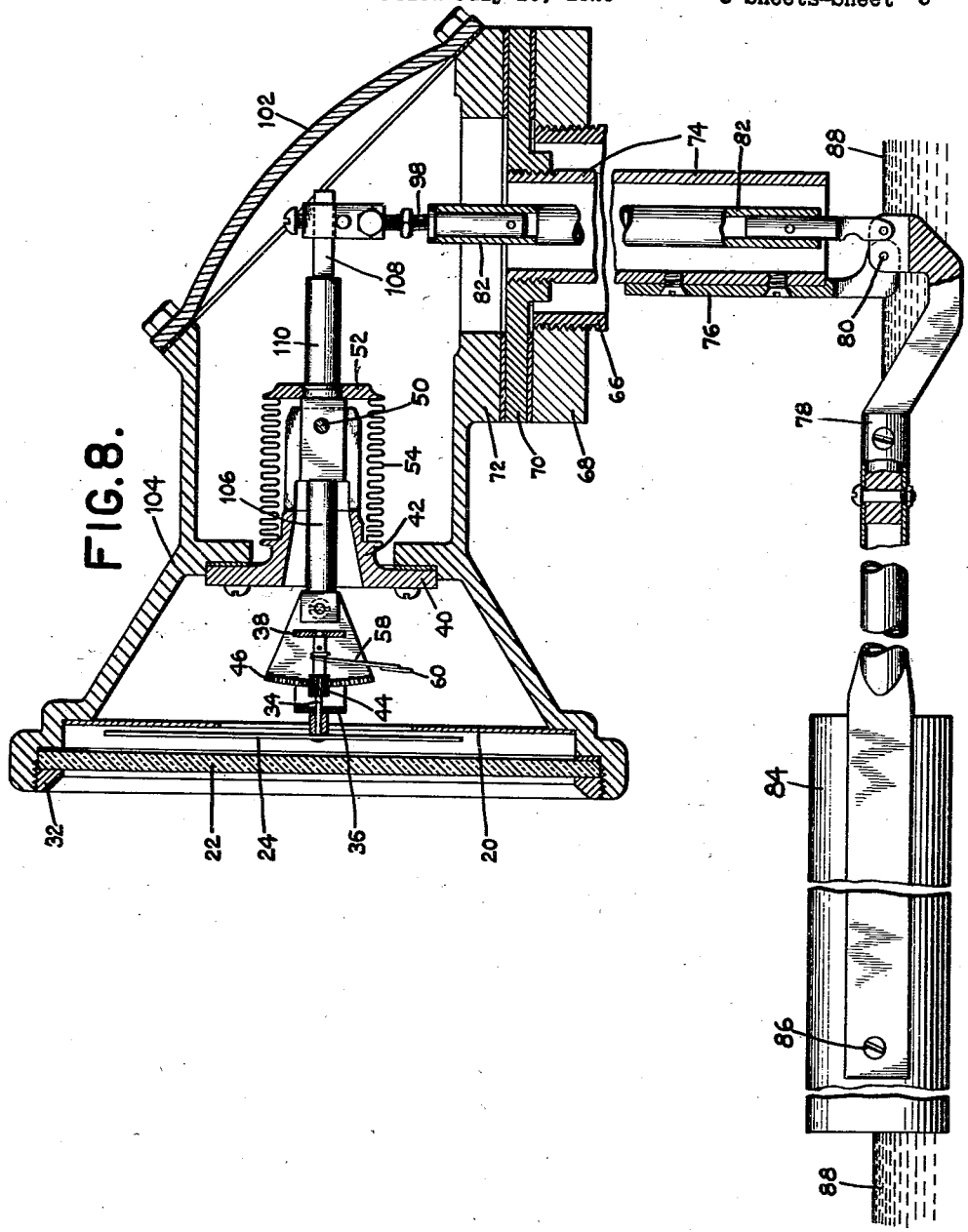

Feb. 6, 1934.　　　C. A. DE GIERS　　　1,945,736
LIQUID LEVEL INDICATOR
Filed July 10, 1929　　5 Sheets-Sheet 4
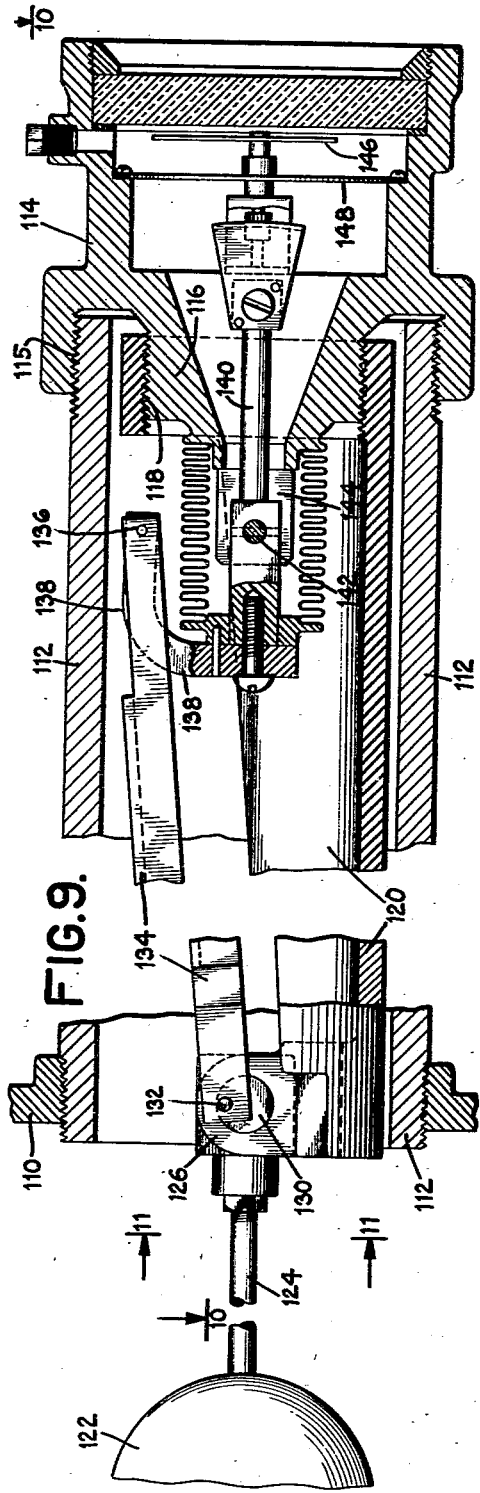
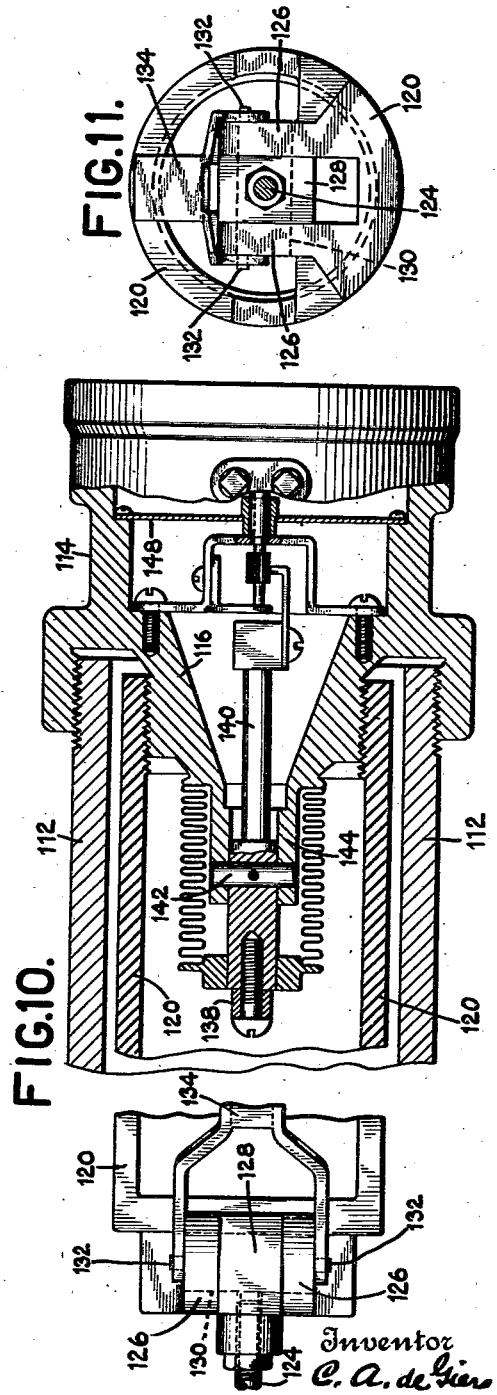
Inventor
C. A. de Giers
By his Attorneys
Cooper, Kerr & Dunham

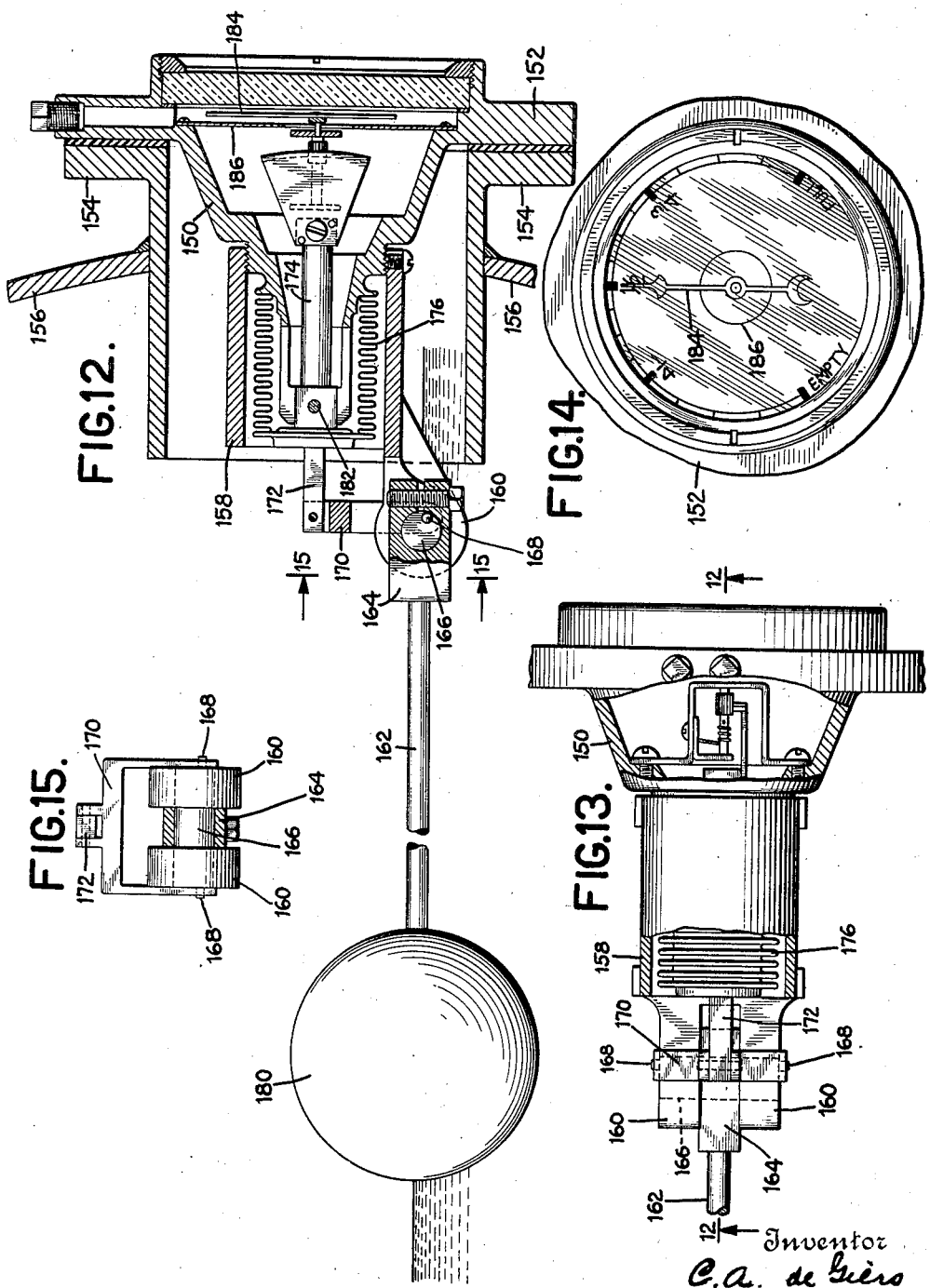

Patented Feb. 6, 1934

1,945,736

UNITED STATES PATENT OFFICE 1,945,736

LIQUID LEVEL INDICATOR

Clarence A. de Giers, Forest Hills, N. Y., assignor, by mesne assignments, to Richard C. Murphy, New York, N. Y.

Application July 10, 1929. Serial No. 377,088

4 Claims. (Cl. 73—82)

This invention pertains to instruments adapted for direct connection to a tank containing liquid, for the purpose of indicating the amount of liquid in the tank.

The principal object of the invention is to provide an instrument in which the pointer will travel around a circular chart or dial in order to be able to indicate with greater accuracy than has been the case with those devices which simply move a pointer in a straight line over a comparatively small chart.

Another object is to provide a mechanism which is readily adaptable for installation with the dial vertical or horizontal.

Another object is to provide the instrument with adjustments by which it may be adapted to give accurate indications on tanks which vary somewhat in dimensions from the exact tank dimensions for which the device may have been previously adjusted.

Further and other objects and advantages will be apparent from the specification and claims, and from the drawings which illustrate what is now considered the preferred embodiment of the invention.

Fig. 1 is a cross-section of an instrument with horizontal dial.

Figs. 2 and 3 are enlarged details of adjusting devices.

Fig. 4 is a detail cross-section on the line 4—4 of Fig. 1.

Fig. 5 is a cross section of Fig. 1, on the line 5—5 thereof.

Fig. 6 is a plan view of Fig. 1.

Fig. 7 is a view on line 7—7 of Fig. 1.

Fig. 8 is a cross section similar to Fig. 1 but with the dial vertical instead of horizontal.

Fig. 9 is a cross section of an instrument modified for insertion into the side of a tank.

Fig. 10 is a cross section on line 10—10 of Fig. 9.

Fig. 11 is a cross section on line 11—11 of Fig. 9.

Fig. 12 is a cross section on line 12—12 of Fig. 13 showing another model for attachment to the side of a tank.

Fig. 13 is a plan view of Fig. 12, partly broken away.

Fig. 14 is a face view of Fig. 13.

Fig. 15 is a view on line 15—15 of Fig. 12.

Figs. 1 to 7 inclusive show the instrument with dial horizontal, Fig. 8 shows the same device with dial placed vertical, Figs. 9 to 11 disclose a modified form adapted for placing the dial at quite a distance horizontally from the tank, while Figs. 12-15 show an improved form of indicator especially adapted for Pullman car tanks, and so forth.

Referring first to Figs. 1-7, the reading dial 20 is mounted under a glass face 22, and a pointer 24 rotates above the dial. The indicator mechanism is enclosed in a hollow body member 26 having upper and lower compartments or chambers 28 and 30. Glass face 22 is held in the upper opening by locking ring 32 in such manner as to seal chamber 28 from the atmosphere.

Pointer 24 is fast to the upper end of vertical spindle 34 supported for rotation by yoke 36 and bracket 38 attached to the yoke. The yoke is attached to flange 40 of tubular member 42 mounted in the lower part of chamber 28 and extending downwardly into chamber 30. Spindle 34 is provided with a pinion 44 in mesh with toothed sector gear or rack 46 fast on the upper end of upstanding arm 48 pivoted on pin 50 in the lower end of tubular member 42. Fast on the lower end of arm 48 is a disk 52, to which is attached the lower end of a sylphon 54 which surrounds the lower portion of tubular member 42. The sylphon is sealed at its upper and lower ends to member 42 and to disk 52, and flange 40 is sealed on its seat by packing 56,—therefore the entire upper chamber 28 is hermetically sealed from lower chamber 30, thus protecting the mechanism enclosed therein from the contents of the tank. Spindle 34 is provided with the usual thread 58 and spring 60 to prevent back lash between pinion and gear.

In operation, as will appear, arm 48 is rocked about its pivot 50 by arm 62 attached to the lower end of arm 48. When such rocking occurs, sector 46 rotates pointer 24 by means of pinion 44 to indicate the amount of movement of arm 62.

When arm 48 and its attachd disk 52 are moved, sylphon 54 flexes to accommodate itself to the new position of those parts. Since all pressure on the lower side of head or disk 52 is absorbed by pin 50, the operation of the device is not affected by changes of pressure within the tank.

The instrument is attached to tank 64 by means of pipe nipple 66 extending upwardly therefrom. On the upper end of the nipple is a flange 68, upon which rests a flange 70, and above flange 70 is mounted flange 72, formed on the bottom surface of body 26. Flanges 68, 70 and 72 are bolted together with suitable packing between.

Depending from flange 70 is a pipe 74 carrying a bracket 76 upon which float arm 78 is pivoted at 80. A vertical link 82 passing upwardly through pipe 74 serves to operatively interconnect float arm 78 and arm 62. Pipe 74 and link 82 are of suitable length for the tank in which they are installed, as is also float arm 78. The float 84 is a horizontal cylinder pivoted at 86 on arm 78.

With the above mechanism in mind the operation of the device will readily be understood. As the float rises or falls due to change of level of liquid 88, arm 78, rotating about its pivot 80, moves link 82 vertically, moving arm 62 and rocking arm 48 to rotate the pointer as described above. Thus the pointer always moves in harmony with the float to indicate on the chart or dial the amount of liquid in the tank.

The method of connecting the upper end of link 82 to arm 62 is shown in detail in Figs. 2 and 3. Slidable on arm 62 is a block 90 provided with a set screw 92 to lock it in position. Pivoted by pin 94 on the lower part of block 90 is a yoke 96, into which is threaded the upper end of the right-and-left threaded screw 98. The lower end of screw 98 is threaded into the upper end of link 82 and may be rotated by a wrench to increase or decrease the effective length of link 82. This adjustment is used to set the position of the pointer with reference to the position of the float, or, as usually stated, to adjust the pointer to zero on the dial. When the adjustment is made, set screw 100 serves to hold it.

By moving block 90 along arm 62 the effective length of arm 62 is changed, with the result that for a given float travel the amount of rock of arm 48 and the amount of rotation of pointer 24 are changed. This means that each instrument may be adjusted to give correct indications regardless of slight variations in tank dimensions. Screw 98 is first adjusted until the pointer is on zero, when the tank is empty, and then when the tank is full block 90 is moved until the pointer is on the tank capacity mark. A cover plate 102 is provided to allow easy access to the above adjustments.

Fig. 8 shows an instrument similar to the one above described except that body 26 has been replaced by a body 104 of such shape as to render the dial readable in a vertical position and to support the pointer operating device horizontally instead of vertically. Thus, vertical arm 48 is replaced by a horizontal arm 106, and arm 62 is replaced by a shorter arm 108 set into the end 110 of arm 106 which projects beyond head 52.

Figs. 9 to 11 inclusive show a modified form of the instrument, wherein it is attached to the tank by a comparatively long tubular member which supports the reading face at any desired distance from the tank. The tank is designated 110 and the supporting tube is 112. The instrument body 114 is screwed onto the outer end of the tube at 115. The portion of body 116 within the end of tube 112 is threaded at 118 to receive the ring-like threaded end of bracket 120 which extends through tube 112 into the tank for the purpose of supporting within the tank the float 122 and float arm 124. Rising from the free end of bracket 120 are two ears 126, between which is a hub 128 to which float arm 124 is attached. A pin 130 passes through ears 126 and hub 128 to pivot the float arm so that the float may rise and fall with change of level of the liquid in the tank. Pin 130 is fast to hub 128 and oscillates therewith. Projecting from the ends of pin 130 are the axially aligned pins 132, set off center with respect to pin 130 so as to have a crank action about the axis of pin 130. Connected to pins 132 is the channel shaped link 134 extending substantially horizontally to connect at 136 to the end of bent arm 138, which is attached to the outer end of the horizontal arm 140 pivoted by pin 142 on the tubular extension 144 of body 116. As the float rises and falls, pins 132 move link 134 longitudinally, and arm 138 is moved to rock arm 140 about pin 142, exactly as arm 106 in Fig. 8 is rocked about its pivot pin 50, with the result that pointer 146 is moved around dial 148 just as in the models previously described.

Figs. 12 to 15 show an instrument similar to those above described so far as concerns the indicating mechanism, but somewhat simplified so far as body and operating mechanism are concerned. The hollow body 150 of the device is provided with a flange 152 for attachment to a tubular flange 154 welded into the side of tank 156. Threaded onto the rear of body 150 is a tubular member 158 provided with a pair of supporting ears 160, to which float arm 162 is pivoted by means of arm hub 164 and trunnion pin 166. Pin 166 turns with hub 164 and has two crank pins 168 on its ends which actuate a U-shaped vertical link 170 connected at its upper end to the outer end of arm 172 which is an extension of horizontal arm 174 within sylphon 176, the arrangement being exactly the same as in Fig. 8. When float 180 rises and falls, pins 168, through link 170, rock arms 172 and 174 about pivot 182 and pointer 184 is rotated around dial 186, exactly as in the devices already fully described.

It is to be understood that the invention is not limited to the specific construction herein illustrated but may be used in other ways without departure from its spirit as defined by the following claims.

I claim—

1. In apparatus of the class described, in combination, a body member adapted for mounting on a tank containing liquid, a member pivoted on said body member, a head on said pivoted member, means rigidly attached to said head for rotating said pivoted member, a float on the liquid, a float arm pivoted on said body member, means pivoted on said float arm interconnecting said float and said rigidly attached means whereby said first mentioned pivoted member is moved when a change of liquid level moves the float, and a sylphon interconnecting said head and said body for sealing said pivoted member from the tank contents.

2. The invention set forth in claim 1, in which said body is hollow, and devices are provided within said body and operable by said pivoted member for indicating the position of the float in the tank.

3. The invention set forth in claim 1, in which said body is hollow, and devices are provided within said body and operable by said pivoted member for indicating the position of the float in the tank, the interconnection between said body, and said sylphon serving to form a closed chamber for hermetically enclosing said indicating mechanism, substantially as described.

4. In an instrument of the class described, in combination, a body member adapted for mounting on a tank containing liquid, said body comprising a chamber open to the tank and another chamber sealed from the tank, indicating devices in said sealed chamber, a float on the liquid in the tank, an arm in said open chamber operatively connected to said devices, a link operatively interconnecting said float and said arm and adjusting means for changing the point of connection of said link and said arm whereby the relative positions of said float and said indicating devices may be changed, for the purpose set forth.

CLARENCE A. DE GIERS.